US012748295B2

(12) United States Patent
Christ

(10) Patent No.: US 12,748,295 B2
(45) Date of Patent: Sep. 29, 2026

(54) SAMPLE CARRIER INTERFACE AND METHOD

(71) Applicant: Leica Microsystems CMS GmbH, Wetzlar (DE)

(72) Inventor: Stefan Christ, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 250 days.

(21) Appl. No.: 18/730,336

(22) PCT Filed: Jan. 26, 2023

(86) PCT No.: PCT/EP2023/051856
§ 371 (c)(1),
(2) Date: Jul. 19, 2024

(87) PCT Pub. No.: WO2023/144238
PCT Pub. Date: Aug. 3, 2023

(65) Prior Publication Data

US 2025/0172793 A1 May 29, 2025

(30) Foreign Application Priority Data

Jan. 28, 2022 (EP) .................................... 22153964

(51) Int. Cl.
*G02B 21/26* (2006.01)
*B01L 3/00* (2006.01)
(Continued)

(52) U.S. Cl.
CPC .......... *G02B 21/26* (2013.01); *B01L 3/50853* (2013.01); *G02B 21/34* (2013.01);
(Continued)

(58) Field of Classification Search
None
See application file for complete search history.

(56) References Cited

U.S. PATENT DOCUMENTS 6,433,325 B1 8/2002 Trigg
12,339,434 B2 * 6/2025 Monk ................ G02B 21/0092
(Continued)

FOREIGN PATENT DOCUMENTS

EP 1548484 A1 6/2005
EP 1898246 A2 3/2008
(Continued)

*Primary Examiner* — Robert E. Tallman
(74) *Attorney, Agent, or Firm* — LEYDIG, VOIT & MAYER, LTD.

(57) ABSTRACT

A sample carrier interface for mounting a sample carrier on a microscope stage includes a frame configured to receive the sample carrier and to be positioned atop an opening of the microscope stage, and a locking device configured to exert a lateral force to the sample carrier when the locking device is in a locked state to keep the sample carrier suspended above the opening when the sample carrier is received in the frame and the frame is positioned atop the opening of the microscope stage. The locking device is further configured to hold the sample carrier in place when the locking device is in the locked state and the sample carrier interface is moved to and from the microscope stage. The locking device includes an adjusting element for switching between the locked state and an unlocked state in which the locking device does not exert the lateral force.

15 Claims, 21 Drawing Sheets

(51) Int. Cl.

| | |
|---|---|
| ***G02B 21/00*** | (2006.01) |
| ***G02B 21/34*** | (2006.01) |
| *B01L 9/00* | (2006.01) |

(52) U.S. Cl.
CPC ....... *B01L 9/523* (2013.01); *B01L 2200/0689* (2013.01); *B01L 2300/0829* (2013.01); *G02B 21/0088* (2013.01)

(56) References Cited

U.S. PATENT DOCUMENTS

| | | | | |
|---|---|---|---|---|
| 2002/0090127 | A1 | 7/2002 | Wetzel et al. | |
| 2003/0103662 | A1 | 6/2003 | Finkbeiner | |
| 2004/0047033 | A1 | 3/2004 | Nakagawa | |
| 2024/0126065 | A1 * | 4/2024 | Nitta | G02B 21/26 |
| 2025/0130157 | A1 * | 4/2025 | Krueger | B01L 9/523 |
| 2025/0284107 | A1 * | 9/2025 | Beljan | G02B 21/367 |

FOREIGN PATENT DOCUMENTS

| | | | |
|---|---|---|---|
| EP | 1898246 | A3 | 8/2008 |
| JP | 6913985 | B1 | 8/2021 |
| WO | 02/086498 | A1 | 10/2002 |

* cited by examiner

SAMPLE CARRIER INTERFACE AND METHOD

CROSS REFERENCE TO RELATED APPLICATIONS

This application is a U.S. National Phase application under 35 U.S.C. § 371 of International Application No. PCT/EP2023/051856, filed on Jan. 26, 2023, and claims benefit to European Patent Application No. EP 22153964.6, filed on Jan. 28, 2022. The International Application was published in English on Aug. 3, 2023 as WO 2023/144238 A1 under PCT Article 21(2).

FIELD

The invention relates to a sample carrier interface for mounting a sample carrier on a microscope stage. The invention further relates to a method for adapting a sample carrier to a microscope stage.

BACKGROUND

In an inverse microscope setup, the detection objective is arranged below a microscope stage. To allow for a microscopical observation of a sample arranged on the microscope stage, the microscope stage of the inverse microscope includes an opening. Typically, the sample is received in a sample carrier, for example a microwell plate, a petri dish or a microscope slide. The sample or samples are observed from below through a window portion arranged at a bottom side of the sample carrier.

In order to mount the sample carrier to the microscope stage of an inverse microscope and prevent the sample carrier from falling through the opening, some inverse microscopes include so called stage inserts. On the one hand, these stage inserts fit into the opening of the microscope stage and, on the other hand, have an inside edge that adapts to the outer shape of the specimen holder. The inside edge include a shelf-like structure on which the microwell plate rests. However, this shelf-like structure collides with the objective when observing samples located close to the inside edge of the stage insert. In particular when the sample carrier is microwell plate, this prevents the use of wells close to the inside edge of the stage insert, thereby greatly reducing the capacity of the sample carrier.

The use of microwell plates is well known in the fields of medical and biological analytics. Most commonly microwell plates are used for high-throughput screening. The use of microwell plates in microscopy, however, is relatively new. Since microwell plates can carry multiple samples in separate wells and have a high sample carrying capacity, and they are often used in the context of high-content microscopy.

SUMMARY

In an embodiment, the present disclosure provides a sample carrier interface for mounting a sample carrier on a microscope stage. The sample carrier interface includes a frame configured to receive the sample carrier and to be positioned atop an opening of the microscope stage; and a locking device configured to exert a lateral force to the sample carrier when the locking device is in a locked state in order to keep the sample carrier suspended above the opening when the sample carrier is received in the frame and the frame is positioned atop the opening of the microscope stage. The locking device is further configured to hold the sample carrier in place when the sample carrier interface is moved to and from the microscope stage, and when the locking device is in the locked state. The locking device includes an adjusting element for switching between the locked state and an unlocked state in which the locking device does not exert the lateral force to the sample carrier.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
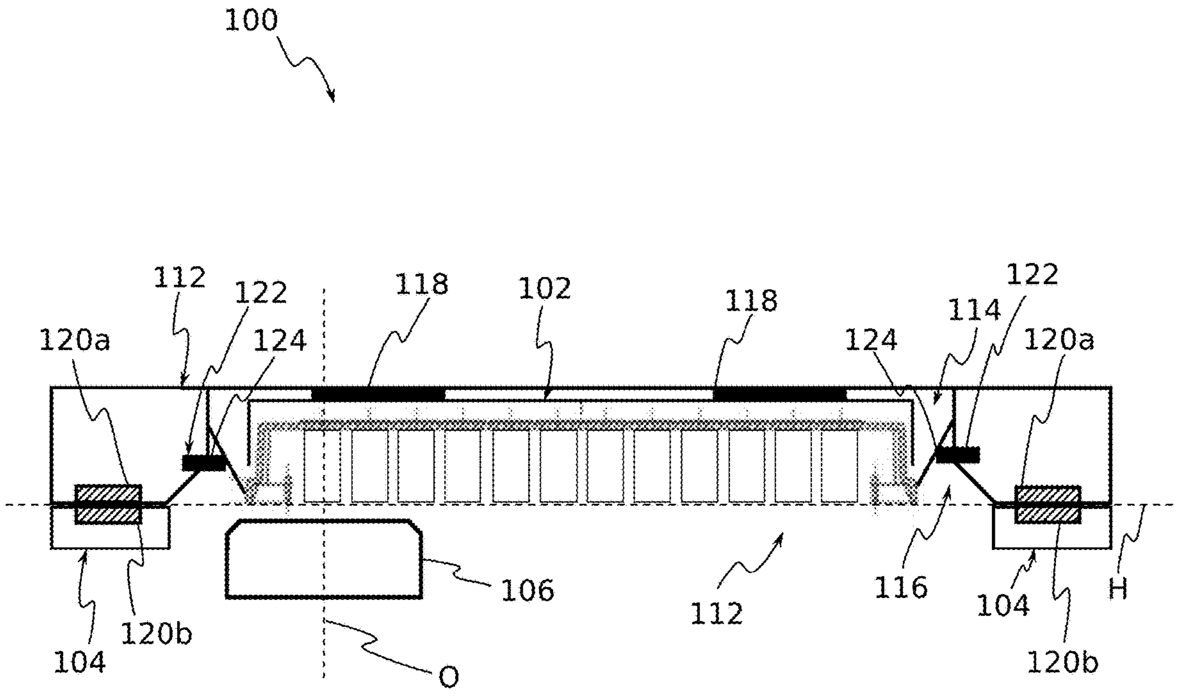
FIG. 1 is a schematic sectional view of a sample carrier interface for mounting a sample carrier on a microscope stage according to an embodiment.

Embodiments of the present disclosure provide a sample carrier interface for mounting a sample carrier on a microscope stage and a method for mounting a sample carrier on a microscope stage that allow the sample carriers capacity to be fully utilized.

In an embodiment, the sample carrier interface for mounting a sample carrier on a microscope stage in a frame is configured to receive the sample carrier and to be positioned atop an opening of the microscope stage. The sample carrier interface further includes a locking device configured to exert a lateral force to the sample carrier when the locking device is in a locked state in order to keep the sample carrier suspended above the opening when the sample carrier is received in the frame and the frame is positioned atop the opening of the microscope stage.

In the embodiment, when the sample carrier is received in the frame, the frame effectively increases the dimensions of the sample carrier such that the sample carrier does not fall through the opening of the microscope stage. Thereby, the sample carrier interface adapts the sample carrier for use with for use with the microscope. The sample carrier is held above or inside the opening by the sample carrier interface. Samples received in the sample carrier can be observed from below through the opening of the microscope stage.

The sample carrier received in the frame is held in place only by the lateral forces exerted on it by the locking device. Thus, the sample carrier interface does not need any supporting elements below the sample carrier. This allows unrestricted access to a bottom side of the sample carrier, and thus an unobstructed observation of the sample received in the sample carrier from below. In particular embodiments, parts of the sample carrier close to an inside edge of the opening in the microscope stage are unobstructed. The embodiment of the sample carrier interface thus allows the sample carriers capacity to be fully utilized.

In a preferred embodiment, the locking device is configured to hold the sample in place when the sample carrier interface is moved to and from the microscope stage, and when the locking device is in the locked state. Thereby, the sample carrier interface can be loaded with the sample carrier outside the confines of the microscope. This greatly facilitates the use of the sample carrier interface. In particular embodiments, to speed up microscopic observation, several sample carrier interfaces can be loaded with sample carriers in advance.

In another preferred embodiment the frame includes an opening at a bottom side and is configured to receive the sample carrier through said opening. In this embodiment in particular, the bottom side of the sample carrier is completely accessible allowing for an unobstructed observation of the samples received in the sample carrier from below.

In another preferred embodiment the bottom side of the frame defines a contact surface that contacts a top surface of the microscope stage when the frame is positioned atop the opening of the microscope stage. In this embodiment, the sample carrier interface is placed atop the microscope stage. This means that the sample carrier interface does not have to be adapted to a specific opening of a specific microscope stage and can be used with several different microscopes and microscope stages. This greatly increases the versatility of the sample carrier interface.

In another preferred embodiment the contact surface of the frame is at the same height as a bottom side of the sample carrier when the sample carrier is received in the frame and the frame is positioned atop the opening of the microscope stage. In this embodiment, when the sample carrier interface is placed atop the microscope stage, the sample carrier is positioned above the opening in the microscope stage and the bottom side of the sample carrier is at the same high as the top surface of the microscope stage. Thereby, the bottom side of the sample carrier is always positioned at an easy to reference height. Thus, no manual adjustment is necessary when the sample carrier interface is positioned on the microscope stage. This, for example, allows for an easier automation of the microscopic observation.

In another preferred embodiment the sample carrier is completely received inside the frame. In this embodiment, the frame wraps around the sample carrier leaving at least the bottom side of the sample carrier exposed. Thereby, the frame protects the sample carrier for example from getting scratched.

In another preferred embodiment the locking device includes an adjusting element for switching between the locked state, and an unlocked state in which the locking device does not exert the lateral force to the sample carrier. In particular embodiments, the adjusting element may be a slider, a button or a rotary switch. The adjusting element allows a user to quickly switch between the locked state and the unlocked state facilitating an easier use of the sample carrier interface.

In another preferred embodiment the locking device includes at least one moveable engaging portion configured to engage with the sample carrier and thereby exert the lateral force to the sample carrier when the locking device is in the locked state. In this embodiment, the engaging portion is brought into contact with the sample carrier in order to exert the lateral force to the sample carrier. The bigger the contact surface between the engaging portion and the sample carrier, the more securely the sample carrier is held by the sample carrier interface. Therefore, it is advantageous to provide multiple engaging portion that engage with the sample carrier from different sides when the locking device is in the locked state.

In another preferred embodiment the locking device includes a wire that wraps around the sample carrier when the sample carrier is received in the frame; and wherein the wire can be tightened in order to exert the lateral force to the sample carrier. In particular embodiments, the wire can be tightened around one or more engaging portions and the sample carrier in order to bring the engaging portions in contact with the sample carrier and to exert the lateral force to the sample carrier. By using a wire, the lateral force exerted to the sample carrier is uniform, which ensures a secure grip on the sample carrier.

In another preferred embodiment the sample carrier interface includes at least one fixing element configured to engage with a corresponding fixing element of the microscope stage. In particular embodiments, the fixing element of the sample carrier interface and the corresponding fixing element of the microscope stage are magnets. Alternatively, or additionally, the corresponding fixing element of the microscope stage includes at least one protruding element, for example a pin, configured to fit into a corresponding hole of the frame, the hole forming the fixing element of the sample carrier interface. The fixing element prevents that the position of the sample carrier interface changes once the sample carrier interface is positioned on the microscope stage.

In another preferred embodiment the sample carrier interface includes at least one guiding portion configured to engage with the microscope stage for positioning the sample carrier interface atop the microscope stage. The guiding portion ensures that the sample carrier interface is reliably positioned at the same predetermined position on the microscope stage every time the sample carrier interface is positioned on the microscope stage. This means that no additional adjustment is necessary, which, for example, allows for an easier automation of the microscopic observation.

In another preferred embodiment the frame is configured to form an incubation chamber when the sample carrier is received in the frame. In particular embodiments, the frame is configured to form a gas tight incubation chamber when the sample carrier is received in the frame. In this embodiment, the sample carrier interface is used as a so called stage top incubator. The sample carrier interface can be used to provide a sample received in the sample carrier with an incubation atmosphere and/or a (semi-) sterile atmosphere. Since the incubation chamber is formed by the sample carrier interface itself, the microscope itself does not need to be specifically adapted.

In another preferred embodiment the locking device includes a sealing portion configured to provide a gas tight seal to the incubation chamber when the sample carrier is received in the frame and the locking device is in a locked state. In this embodiment, the sample carrier forms part of the walls of the incubation chamber. This makes the sample carrier interface much lighter, and thus easier to handle. Further, this saves material cost.

In another preferred embodiment the frame includes a gas inlet for providing an incubation atmosphere and/or a (semi-) sterile atmosphere to the incubation chamber. In this embodiment, the gas inlet is for example connected to a climate control unit for controlling temperature, humidity, and CO2-content of the provided atmosphere. This allows for to a precise control over the environment of the samples received in the sample carrier.

In another preferred embodiment the sample carrier is a microwell plate or a slide holder. In particular embodiments, the frame is adapted to receive a specific type or form factor of sample carrier, for example a microwell plate or a slide holder. By adapting the frame to a specific form factor, the sample carrier is received much more secure inside the frame.

Embodiments of the present disclosure further relate to a method for mounting a sample carrier on a microscope stage. The method includes the following steps: providing a sample carrier interface as described above; inserting the sample carrier into a frame of the sample carrier interface; locking the sample carrier to the frame by exerting a lateral force to the sample carrier; and placing the sample carrier interface atop an opening of the microscope stage in order to suspend the sample carrier above the opening.

An embodiments related to the method has the same advantages as an embodiment related to the sample carrier interface described above. In particular embodiments, the method can be supplemented using the features directed at the sample carrier interface.

In a preferred embodiment the method includes the following additional steps: placing the sample carrier on a flat surface or a dedicated mounting plate; and lowering the sample carrier interface onto the sample carrier from above. By lowering the sample carrier interface onto the sample carrier from above, the contact surface of the frame is positioned at the same height as the bottom side of the sample carrier. Thereby, the bottom side of the sample carrier is always positioned at an easy to reference height, and no manual adjustment is necessary when the sample carrier interface is positioned on the microscope stage.

Hereinafter, specific embodiments are described referring to the drawings.

FIG. 1 is a schematic sectional view of a sample carrier interface 100 for mounting a sample carrier 102 on a microscope stage 104 according to an embodiment.

FIG. 1 also shows an objective 106 of a microscope. The optical axis O of the objective 106 is shown as a dashed vertical line. In FIG. 1 the sample carrier 102 is exemplary shown to be a microwell plate having multiple wells 108 for receiving a sample each.

The sample carrier interface 100 is configured to prevent the sample carrier 102 from falling through an opening 110 of the microscope stage 104. The opening 110 of the microscope stage 104 allows the samples received in the sample carrier 102 to be observed from below via the objective 106. However, the opening 110 of the microscope stage 104 is typically larger than the dimension of the sample carrier 102. Thus, the sample carrier interface 100 is needed to adapt the sample carrier 102 to the microscope stage 104.

The sample carrier interface 100 includes a frame 112 which holds the sample carrier 102. The dimensions of the frame 112 are such that the frame 112 can be placed above the opening 110 of the microscope stage 104 without falling through. A bottom side of the frame 112 forms a contact surface which is in contact with a top surface of the microscope stage 104 when the sample carrier interface 100 is placed on the microscope stage 104.

In the present embodiment, the sample carrier 102 is completely received in a cavity 114 formed by the frame 112. The sample carrier 102 can be inserted into the cavity 114 through an opening 116 located at the bottom side of the frame 112. In the present embodiment, the frame 112 extends circumferentially around the sample carrier 102 and is closed at the top. In other words, the frame 112 forms an upside-down box which can be put over the sample carrier 102 in order to insert the sample carrier 102 into the frame 112. The cavity 114 of the frame 112 is wider at the bottom side of the frame 112 and tapers upwards. This tapered geometry of the cavity 114 guides the sample carrier 102 into position when the sample carrier interface 100 is lowered onto the sample carrier 102 in order to insert the sample carrier 102 into the frame 112. Further, this tapered geometry prevents the objective 106 from colliding with the frame 112 when the objective 106 is directed at wells 108 close to an inside edge of the opening 110 of the microscope stage 104, and thereby allows greater access to the sample carrier 102 from below.

The frame 112 according to the present embodiment also includes spacer elements 118 arranged at a top side of the frame 112 that prevent the sample carrier 102 from being inserted to far into the cavity 114. In particular embodiments, the sample carrier 102 is inserted into the frame 112 such that a bottom side of the sample carrier 102, the bottom side of the frame 112 and a top surface of the microscope stage 104 are all at a same height that is denoted in FIG. 1 by a dashed horizontal line H.

The frame 112 further includes fixing elements 120*a* that are configured to engage with complimentary fixing elements 120*b* of the microscope stage 104. The fixing elements 120*a* of the frame 112 are arranged flush with the bottom side of the frame 112 to the left and right of the sample carrier 102 in FIG. 1. The fixing elements 120*b* of the microscope stage 104 are arranged flush with the top surface of the microscope stage 104 to the left and right of the opening 110 of the microscope stage 104 in FIG. 1. In the present embodiment, the fixing elements 120*a* of the frame 112 and the complimentary fixing elements 120*a* of the microscope stage 104 are formed by magnets.

The sample carrier interface 100 further includes a locking device 122 configured to lock the sample carrier 102 received in the frame 112. The locking device 122 has a locked state in which the sample carrier 102 is locked in position, and an unlocked state in which the sample carrier 102 not locked in position and can for example be removed from the frame 112. FIG. 1 exemplary shows the locking device 122 in its locked state.

The locking device 122 includes moveable engaging portions 124 that are arranged inside the cavity 114 of the frame 112. The engaging portions 124 are positioned such that each engaging portion 124 faces a side surface of the sample carrier 102. The engaging portions 124 can be moved towards the sample carrier 102 in order to engage with the sample carrier 102. When the engaging portions 124 engage with the sample carrier 102, the engaging portions 124 exert a lateral force to the sample carrier 102 which locks the sample carrier 102 in position, and the locking device 122 is in its locked state. Since the sample carrier 102 is held in place only by the engaging portions 124 engaging the sample carrier 102 from the side, the bottom side of the sample carrier 102 is completely unobstructed. Thereby, the objective 106 can easily be positioned under every well 108 of the sample carrier 102 allowing to capacity of the sample carrier 102 to be fully utilized.

Figure 2:
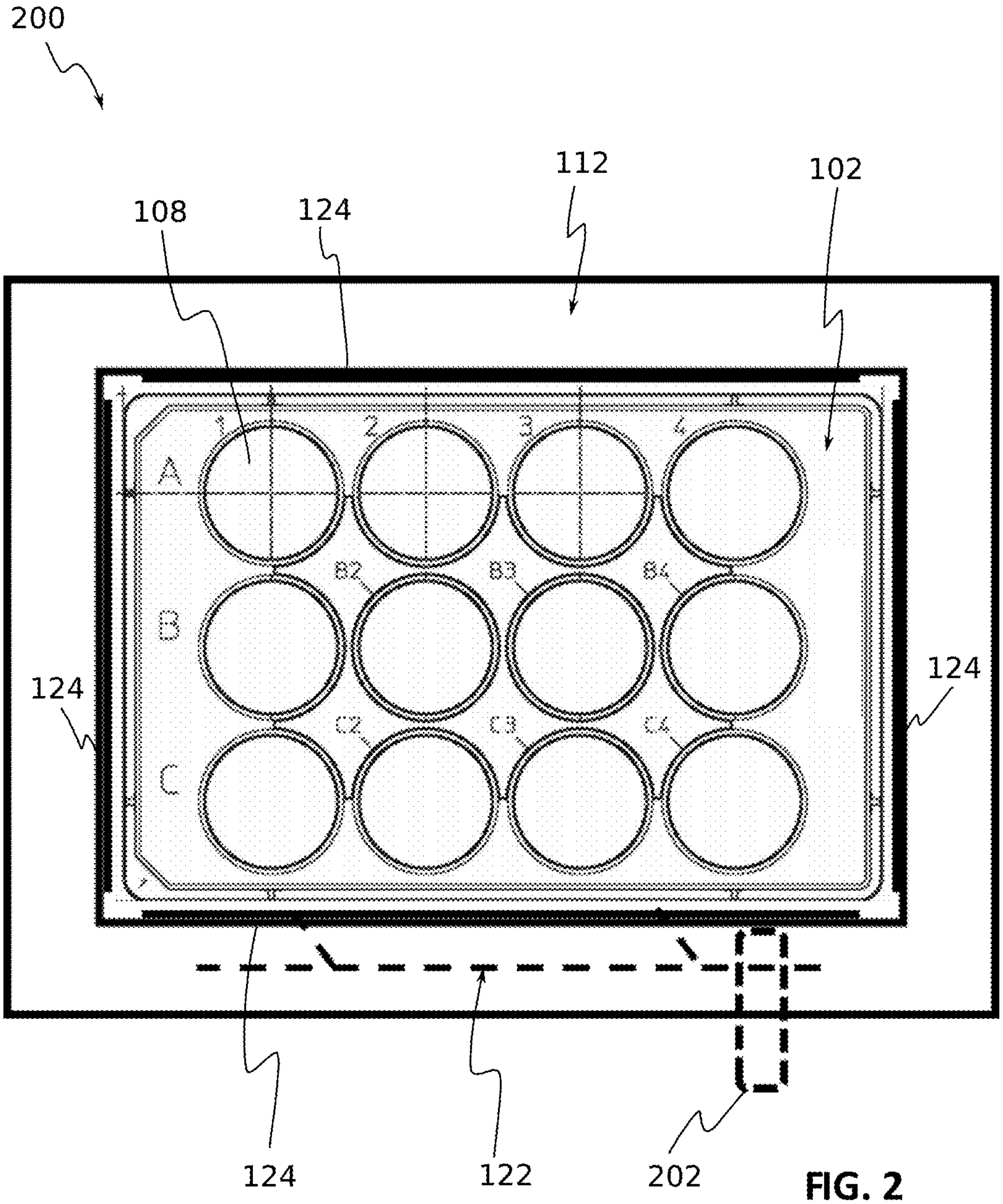
FIG. 2 is a schematic top view of the sample carrier interface according to another embodiment.

FIG. 2 is a schematic top view of the sample carrier interface 200 according to another embodiment.

The sample carrier interface 200 according to FIG. 2 is distinguished form the sample carrier interface 200 according to FIG. 1 in that the frame 112 is open at the top allowing access to the sample carrier 102 from above. As can be seen in FIG. 2, the frame 112 surrounds the sample carrier 102 on all four sides. In particular embodiments, the sample carrier 102 is arranged in the center of the frame 112 when viewed from above. Thus, the sample carrier 102 is located above the center of the opening 110 of the microscope stage 104 when the sample carrier interface 200 is placed on the microscope stage 104. This ensures that all wells 108 of the sample carrier 102 are equally accessible for observation using the objective 106.

The locking device 122 includes an adjusting element for switching between the locked state of the locking device 122 and the unlocked state of the locking device 122. In the present embodiment, the adjusting element is exemplary formed by a slider 202 that can be moved along a side of the frame 112, that is from left to right and back in FIG. 2. The slider 202 has a first position corresponding to the unlocked state of the locking device 122, and a second position corresponding the locked state of the locking device 122. When the slider 202 is moved from the first position to the second position, the engaging portions 124 are moved towards the sample carrier 102 and eventually brought into contact with the side surface of the sample carrier 102. When the slider 202 is moved from the second position back to the first position, the engaging portions 124 are moved away from the sample carrier 102.

In FIG. 2 the locking device 122 is shown in its unlocked state and the slider 202 is in its first position. Thus, as can be seen in FIG. 2, the engaging portions 124 are not in contact with the sample carrier 102. In this state, the sample carrier 102 can be inserted into or removed from the sample carrier interface 200.

Figure 3:
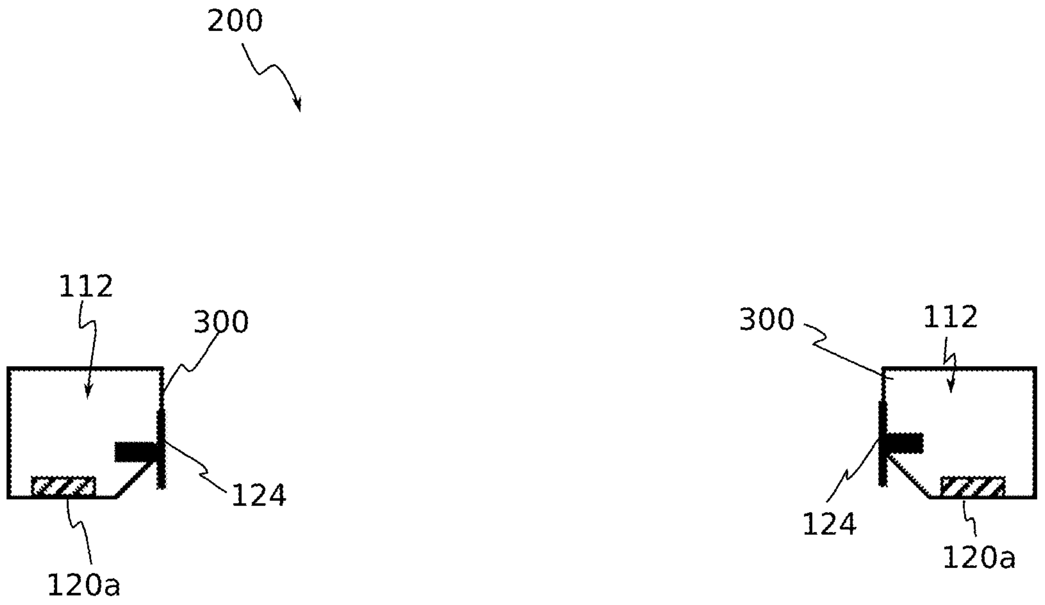
FIG. 3 is a schematic sectional view of the sample carrier interface according to the embodiment of FIG. 2.

FIG. 3 is a schematic sectional view of the sample carrier interface 200 according to FIG. 2.

In FIG. 3 the locking device 122 is shown in its unlocked state. As can be seen in FIG. 3, the engaging portions 124 are located directly at inside walls 300 of the frame 112 when the locking device 122 is in its unlocked state. The sample carrier 102 can thus be inserted unhindered into the frame 112.

Figure 4:
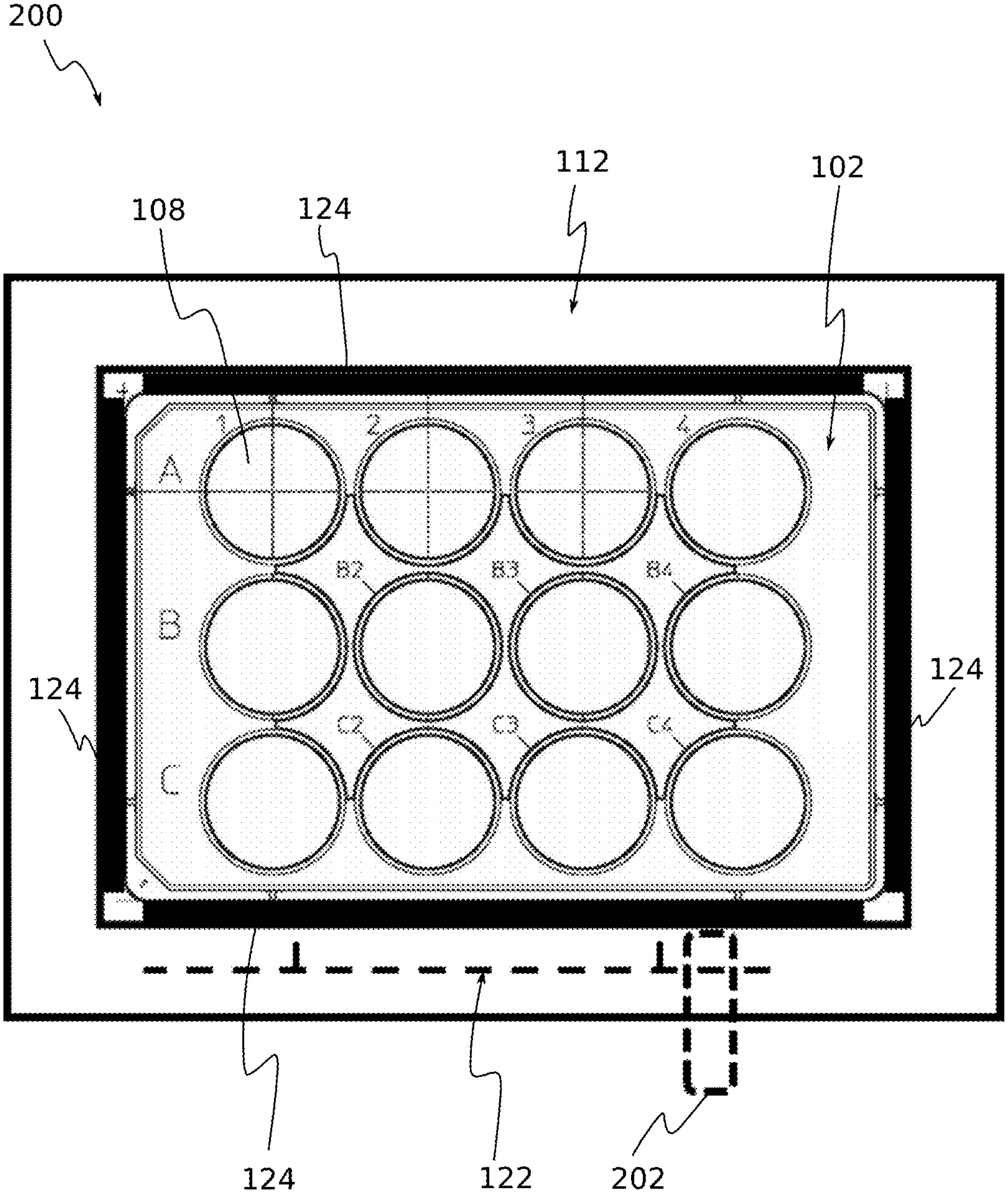
FIG. 4 is a schematic top view of the sample carrier interface according to the embodiments of FIGS. 2 and 3.

FIG. 4 is a schematic top view of the sample carrier interface 200 according to FIGS. 2 and 3.

In FIG. 4 the locking device 122 is shown in its locked state and the slider 202 is in its second position. The engaging portions 124 are in contact with the sample carrier 102 and exert the lateral force to the side surfaces of the sample carrier 102. In this state, the sample carrier 102 is securely held by the sample carrier interface 200 and the sample carrier interface 200 can be used to carry the sample carrier 102.

Figure 5:
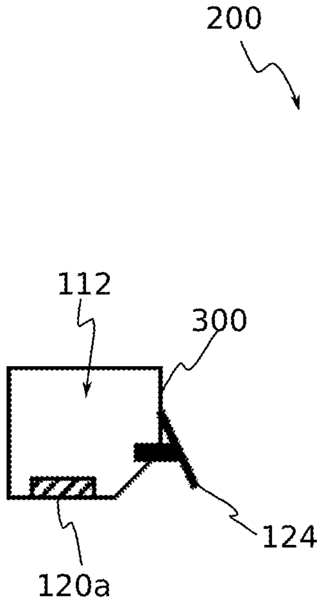
FIG. 5 is a schematic sectional view of the sample carrier interface according to the embodiments of FIGS. 2 to 4.

FIG. 5 is a schematic sectional view of the sample carrier interface 200 according to FIGS. 2 to 4.

In FIG. 5 the locking device 122 is shown in its locked state. An upper part of each of the engaging portions 124 is hinged at the inside walls 300 of the frame 112. A lower part of each of the engaging portions 124 is moved towards the inside of the frame 112, such that the engaging portions 124 are slightly tilted.

Figure 6A:
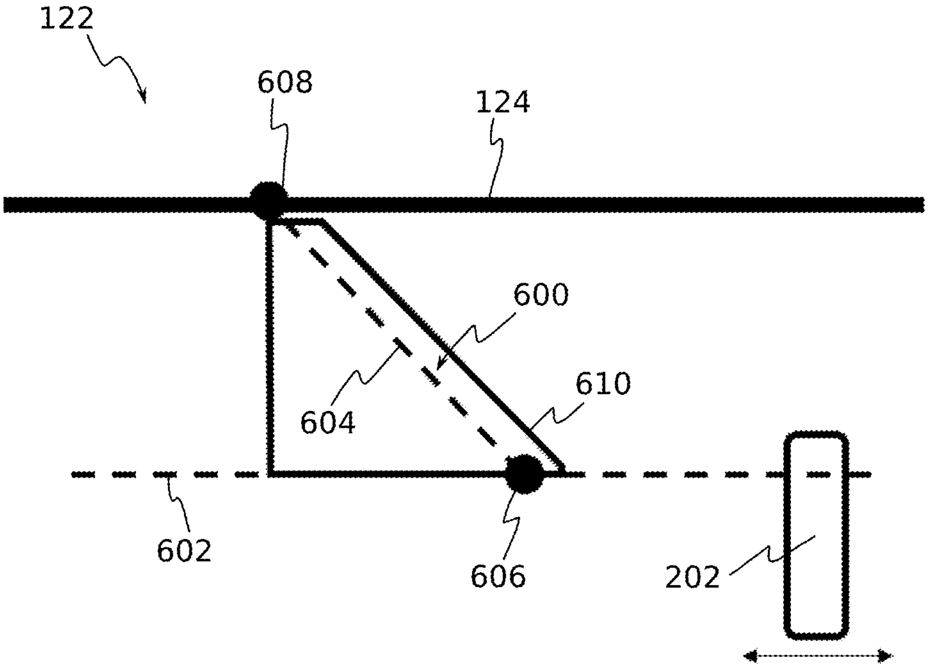
FIG. 6*a* is a schematic view of a locking device of the sample carrier interface according to the embodiments of FIGS. 2 to 5 in their unlocked states.

FIG. 6*a* is a schematic view of the locking device 122 of the sample carrier interface 200 according to FIGS. 2 to 5 in its unlocked state.

The slider 202 is connected to the engaging portion 124 via an arrangement 600 of rods and joints. A first rod 602 is movable in the horizontal direction in FIG. 6*a*, and is connected to a second rod 604 by a first joint 606. The second rod 604 is connected to the engaging portion 124 by a second joint 608. The movement of the second rod 604 is limited by a guiding element 610. In a first position the second rod 604 is arranged such that the first rod 602 and the second rod 604 enclose an angle smaller than 90°. When the locking device 122 is in its unlocked state, the second rod 604 is in the first position.

Figure 6B:
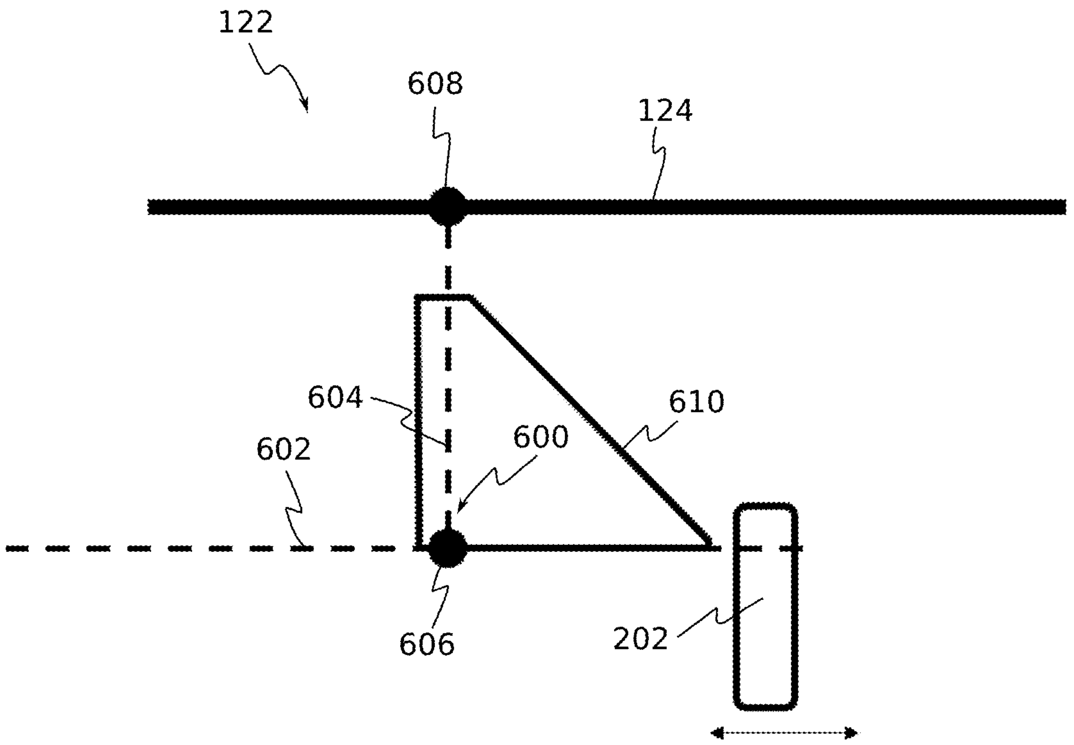
FIG. 6*b* is a schematic view of the locking device of the sample carrier interface according to the embodiments of FIGS. 2 to 5 in their locked states.

FIG. 6*b* is a schematic view of the locking device 122 of the sample carrier interface 200 according to FIGS. 2 to 5 in its locked state.

In a second position the second rod 604 is arranged such that the first rod 602 and the second rod 604 are perpendicular to each other. As can be seen by comparing FIGS. 6*a* and 6*b*, this means that when the second rod 604 is in its second position, the engaging portion 124 is located further away from the first rod 602 than when the second rod 604 is in its first position.

By moving the first rod 602 horizontally to the left in FIGS. 6*a* and 6*b*, the second rod 604 is moved from its first position to its second position. Likewise, by moving the first rod 602 horizontally to the right in FIGS. 6*a* and 6*b*, the second rod 604 is moved from its second position back to its first position. Thus, the arrangement 600 of rods and joints forms a lever that pushes the engaging portion 124 to the top in FIGS. 6*a* and 6*b*, and thus towards the sample carrier 102 received in the frame 112.

FIGS. 7*a* to 7*d* are schematic sectional views of a sample carrier 700 and a sample carrier interface 702 according to an embodiment. When viewed together, FIGS. 7*a* to 7*d* illustrate a method for adapting the sample carrier 700 to a microscope stage 704.

Figure 7A:
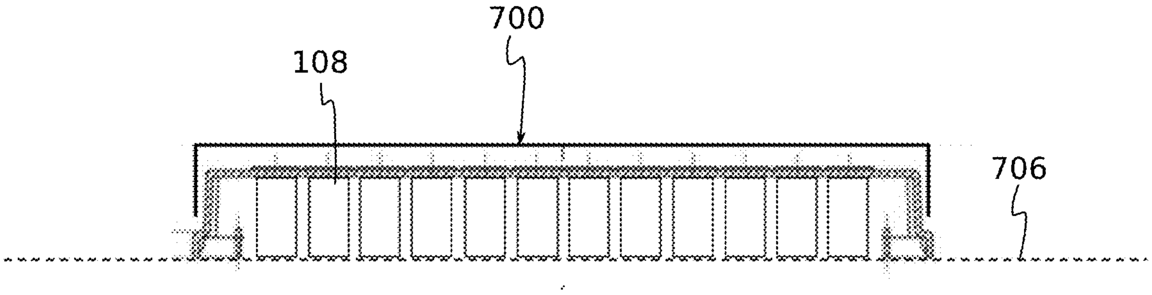
FIG. 7*a* is a schematic sectional view of a sample carrier.

FIG. 7*a* is a schematic sectional view of the sample carrier 700.

The sample carrier 700 is exemplary formed as microwell plate comprising multiple wells 108 for receiving the samples. The sample carrier 700 is arranged atop a flat surface 706, such as a table surface or a dedicated mounting plate. FIG. 7*a* corresponds to a first step in the method for adapting the sample carrier 700 to a microscope stage 704.

Figure 7B:
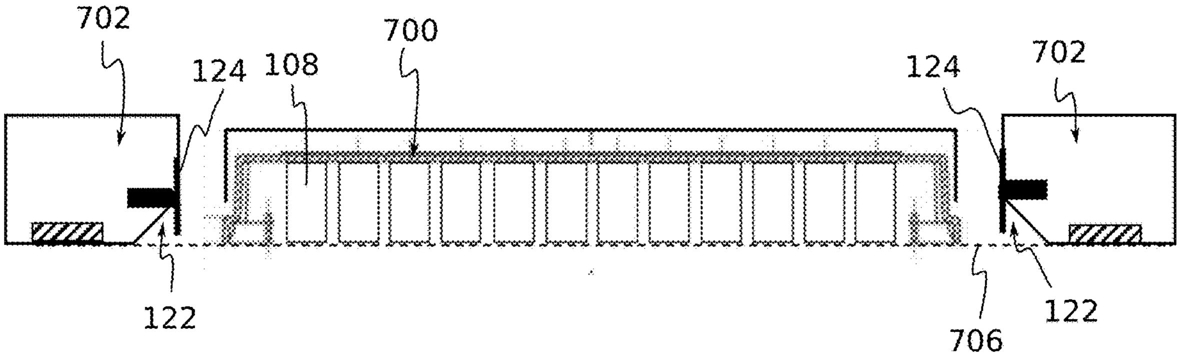
FIG. 7*b* is a schematic sectional view of a sample carrier interface and the sample carrier according to the embodiment of FIG. 7*a;*

FIG. 7*b* is a schematic sectional view of the sample carrier interface 702 and the sample carrier 700.

In FIG. 7*b*, the sample carrier 700 is received inside the sample carrier interface 702 and a locking device 122 of the sample carrier interface 702 is in its unlocked state. FIG. 7*b* corresponds to a second step in the method for adapting the sample carrier 700 to the microscope stage 704. In the second step, the sample carrier 700 is inserted into the frame 112 of the sample carrier interface 702 by lowering the sample carrier interface 702 onto the sample carrier 700 from above.

Figure 7C:
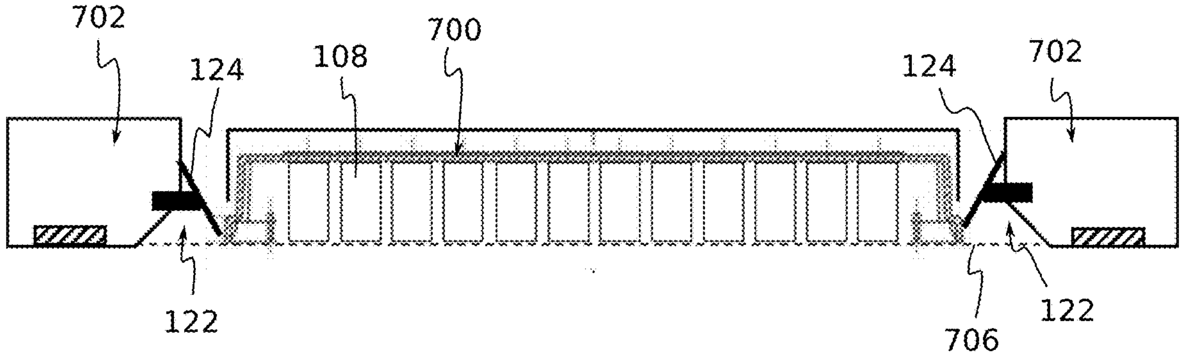
FIG. 7*c* is another schematic sectional view of the sample carrier interface according to the embodiment of FIG. 7*b* and the sample carrier according to the embodiment of FIG. 7*a;*

FIG. 7*c* is another schematic sectional view of the sample carrier interface 702 and the sample carrier 700.

In FIG. 7*c*, the sample carrier 700 is received inside the sample carrier interface 702 and the locking device 122 of the sample carrier interface 702 is in its locked state. FIG. 7*c* corresponds to a third step in the method for adapting the sample carrier 700 to the microscope stage 704. In the third step the sample carrier 700 is locked to the frame 112 by exerting a lateral force to the sample carrier 700. The lateral forces is exerted by the engaging portions 124 of the locking device 122 that are brought into contact with the side surface of the sample carrier 700.

Figure 7D:
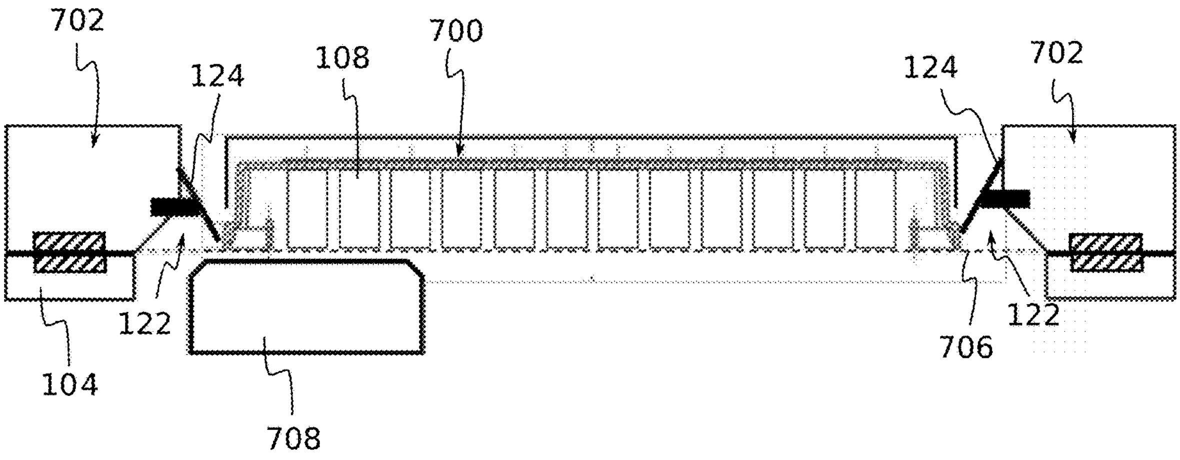
FIG. 7*d* is another schematic sectional view of the sample carrier interface according to the embodiment of FIG. 7*b* and the sample carrier according to the embodiment of FIG. 7*a;*

FIG. 7*d* is another schematic sectional view of the sample carrier interface 702 and the sample carrier 700.

In FIG. 7*d*, the sample carrier 700 is received inside the sample carrier interface 702 and the locking device 122 of the sample carrier interface 702 is in its locked state. The combination of sample carrier interface 702 and sample carrier 700 is positioned atop a microscope stage 704 such that the sample carrier 700 is suspended over an opening 110 of the microscope stage 704. In the suspended state, the samples received in the wells 108 of the sample carrier 700 can be observed via an objective 708 of the microscope. FIG. 7*c* corresponds to a fourth step in the method for adapting the sample carrier 700 to the microscope stage 704. In the fourth step the sample carrier interface 702 is placed atop the opening 110 of the microscope stage 704 in order to suspend the sample carrier 700 above the opening 110.

Figure 8:
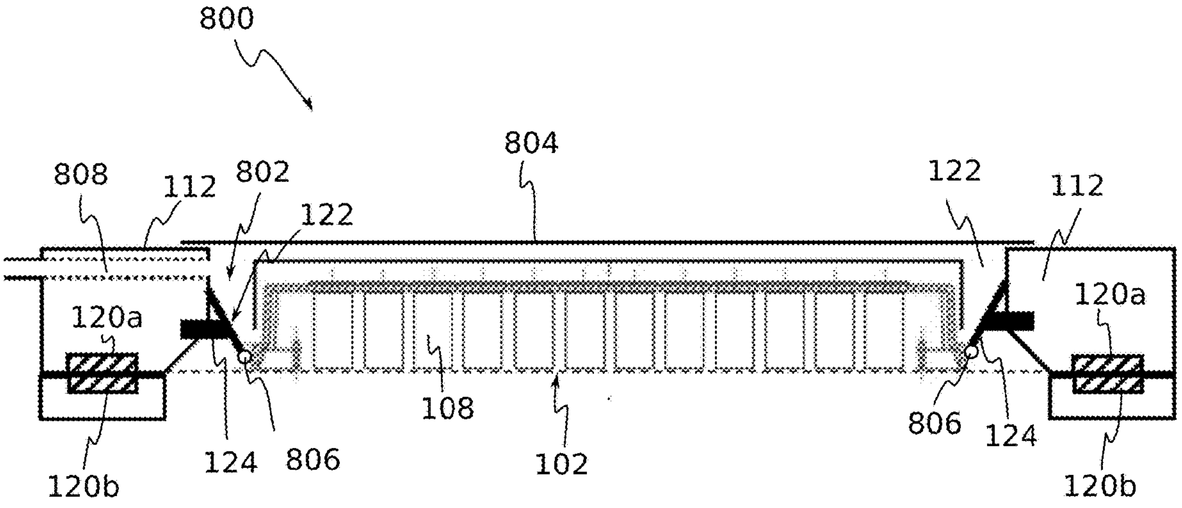
FIG. 8 is a schematic sectional view of a sample carrier interface according to an embodiment having an incubation chamber.

FIG. 8 is a schematic sectional view of a sample carrier interface 800 according to an embodiment having an incubation chamber 802.

The sample carrier interface 800 according to FIG. 8 is distinguished from the sample carrier interface 100 according to FIG. 1 in having the incubation chamber 802 and having means for providing an incubation atmosphere to the incubation chamber 802.

The incubation chamber 802 is formed above the sample carrier 102. The incubation chamber 802 is limited by the frame 112 of the sample carrier interface 800 and the sample carrier 102 itself. The frame 112 is closed by a lid 804 that is placed on top of the frame 112 and that provides a gas tight seal. The engaging portions 124 each include a sealing portion 806 that is configured to provide a gas tight seal to the incubation chamber 802 when the sample carrier 102 is received in the frame 112 and the locking device 122 is in a locked state. This means, that in this embodiment the incubation chamber 802 is only formed when the sample carrier 102 is received in the frame 112, and when the locking device 122 is in its locked state.

A gas inlet 808 is arranged to the right of incubation chamber 802 in FIG. 8. The gas inlet 808 can for example be connected to a climate control unit in order to provide an incubation atmosphere to the incubation chamber 802.

Figure 9:
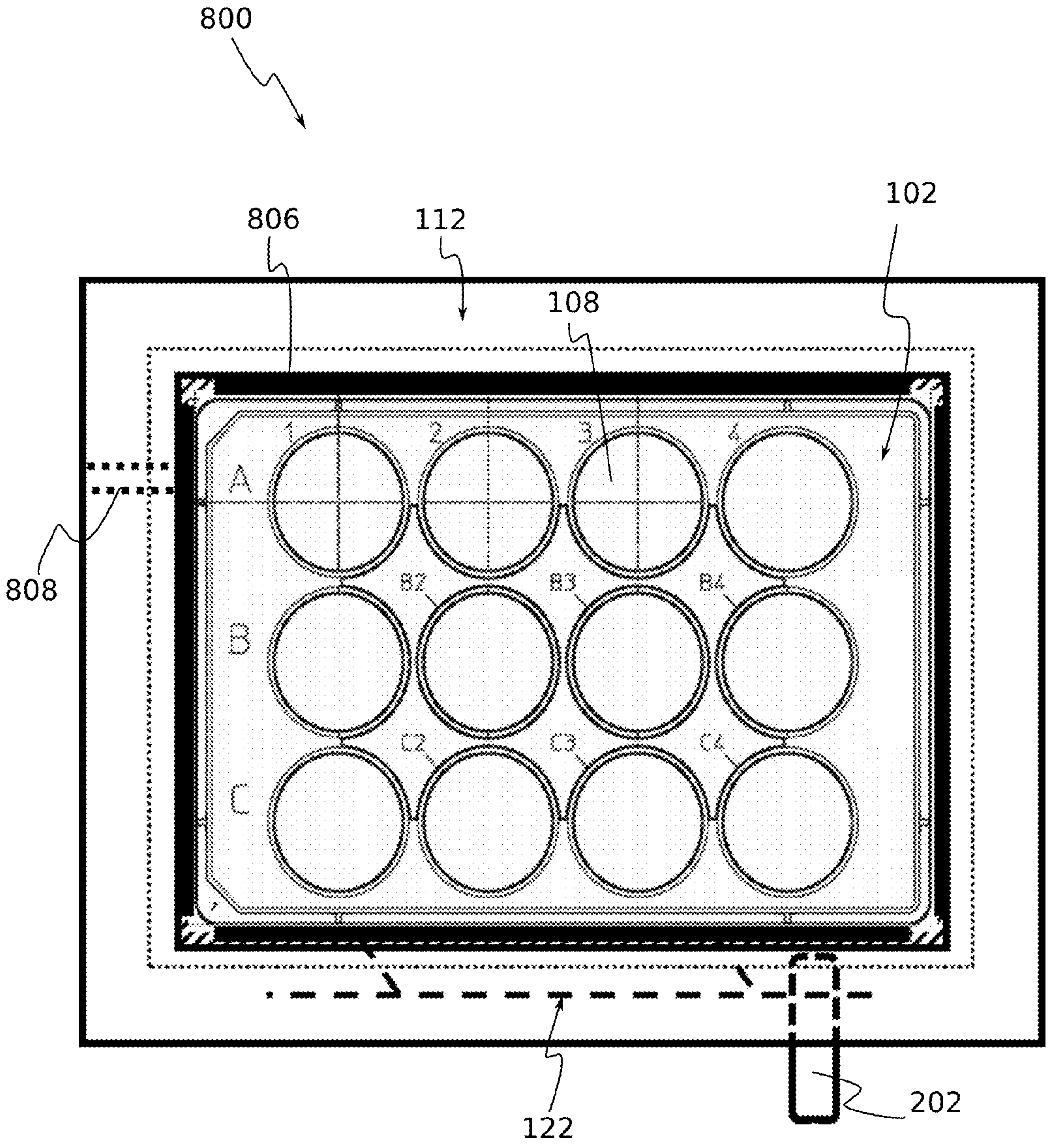
FIG. 9 is a schematic top view of the sample carrier interface according to the embodiment of FIG. 8.

FIG. 9 is a schematic top view of the sample carrier interface 800 according to FIG. 8.

As can be seen in FIG. 9, the sealing portion 806 that ensures a gas-tight seal extends circumferentially around the sample carrier 102. This provides a secure and gas tight seal to the incubation chamber 802. The position of the gas inlet 808 is shown in FIG. 9 as dotted lines.

Figure 10:
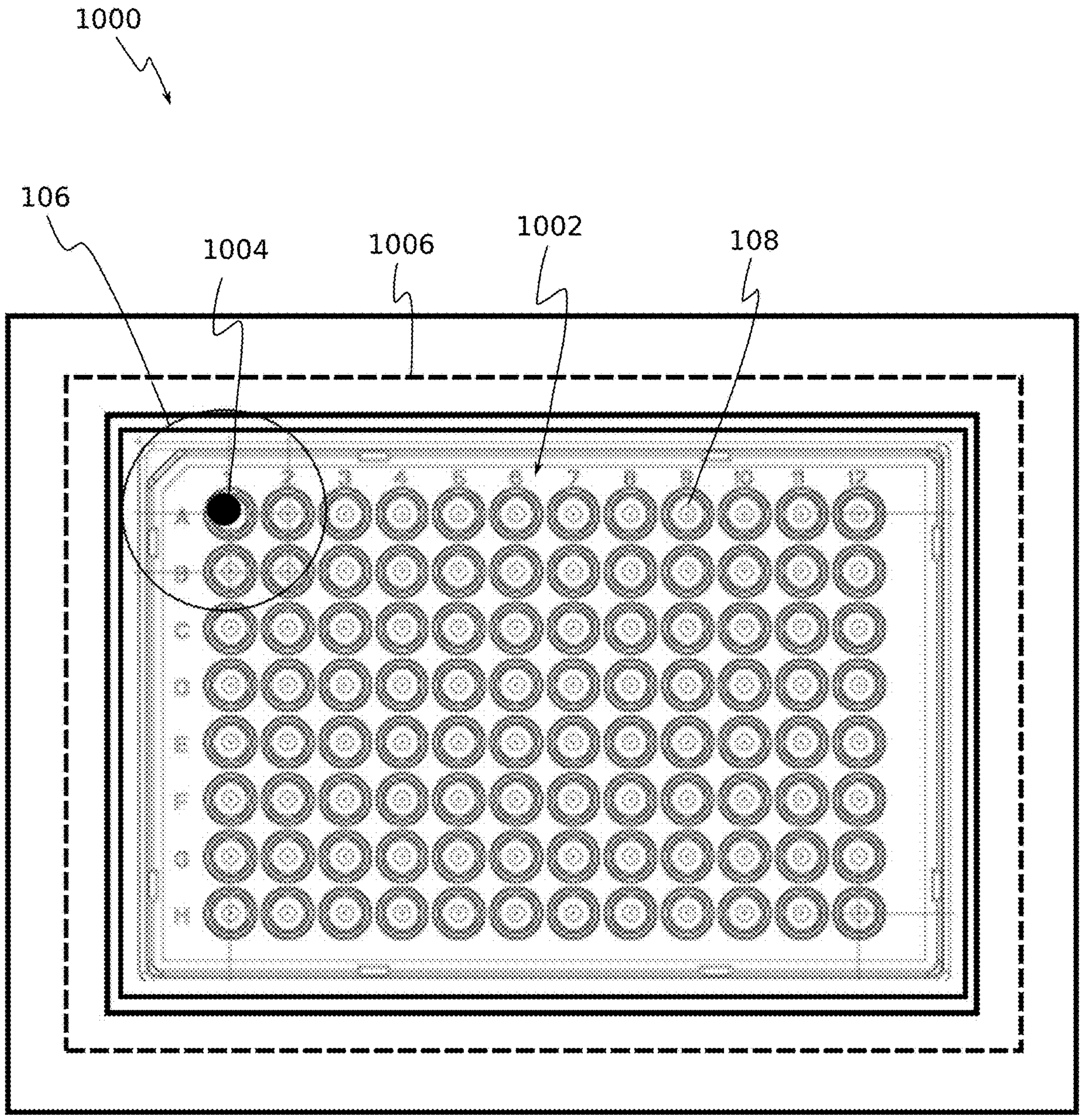
FIG. 10 is a schematic top view of the sample carrier interface according to an embodiment.

FIG. 10 is a schematic top view of the sample carrier interface 1000 according to an embodiment.

The sample carrier 1002 received in the sample carrier interface 1000 is exemplary formed as a microwell plate having 96 wells 108. FIG. 10 shows the position of the objective 106 of the microscope relative to the sample carrier 1002. The position of the optical axis O of the objective 106 is denoted in FIG. 10 by a black dot 1004. The Objective 106 is placed under a well 108 of the sample carrier 1002 located in the top left corner. The position of the opening 110 of the microscope stage 704 is denoted in FIG. 10 by a dashed rectangle 1006. As can be seen in FIG. 10, there is a large gap between objective 106 and the inner edge of the opening 110 of the microscope stage 704. Thus, even when viewing samples located in wells 108 near the inner edge of the opening 110 of the microscope stage 704, there is no risk of the objective 106 colliding with the microscope stage 704.

Figure 11A:
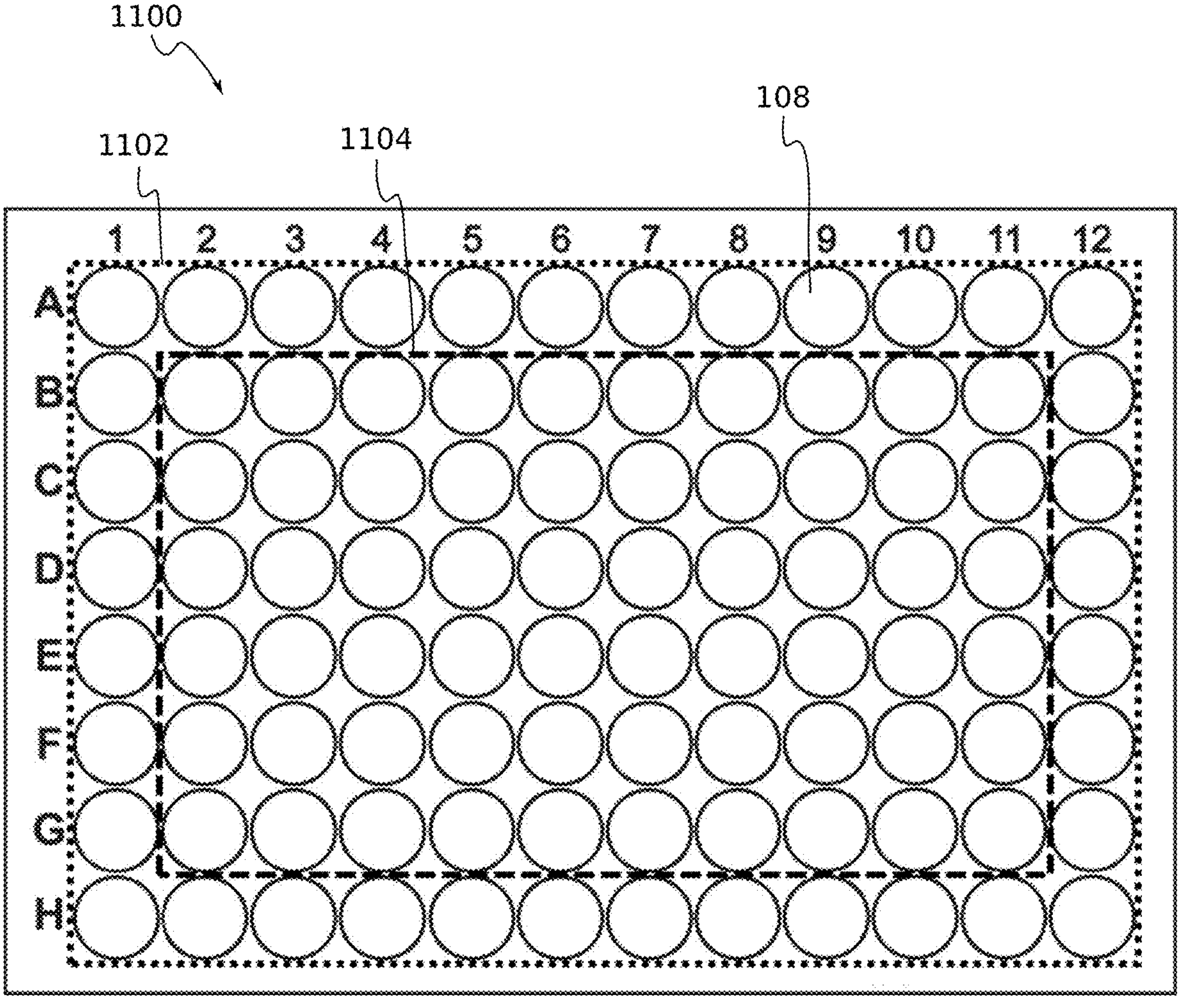
FIG. 11*a* is a schematic top view of a sample carrier embodiment including 96 wells.

FIG. 11*a* is a schematic top view of a sample carrier 1100 comprising 96 wells 108.

A dotted rectangle 1102 in FIG. 11*a* denotes the area accessible to the objective 106 when a sample carrier interface according to any of the embodiments described above is used to mount the sample carrier 1100 on the microscope stage 704. A dashed rectangle 1104 in FIG. 11*a* denotes the area accessible to the objective 106 when a stage insert according to the state of the art is used to mount the sample carrier 1100 on the microscope stage 704. As can be seen in FIG. 11*a*, when a known stage insert is used out, of the 96 wells 108 only 80 are accessible.

Figure 11B:
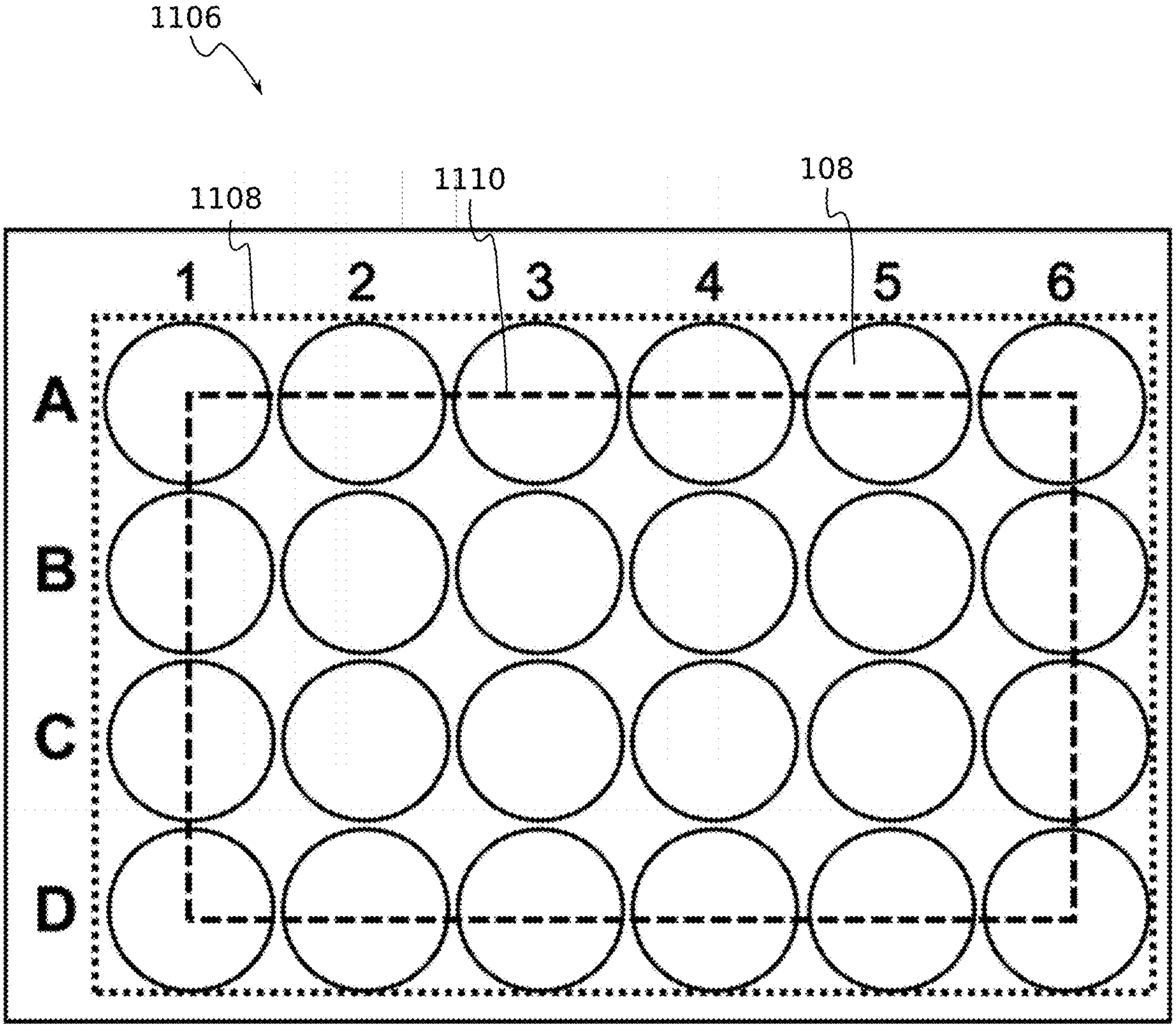
FIG. 11*b* is a schematic top view of a sample carrier embodiment including 24 wells.

FIG. 11*b* is a schematic top view of a sample carrier 1106 comprising 24 wells 108.

A dotted rectangle 1108 in FIG. 11*b* denotes the area accessible to the objective 106 when a sample carrier interface according to any of the embodiments described above is used to mount the sample carrier 1106 on the microscope stage 704. A dashed rectangle 1110 in FIG. 11*b* denotes the area accessible to the objective 106 when a stage insert according to the state of the art is used to mount the sample carrier 1106 on the microscope stage 704. As can be seen in FIG. 11*a*, when a known stage insert is used out, of the 24 wells 108 only 8 are completely accessible, while for the remaining 16 wells 108 are only half of the area of the well 108 is accessible.

When viewed together, FIGS. 11*a* and 11*b* show that using a known stage insert limits the capacity of microwell plates to between around 60% to 80% of the total capacity. The remaining capacity remains inaccessible to observation.

Figure 12A:
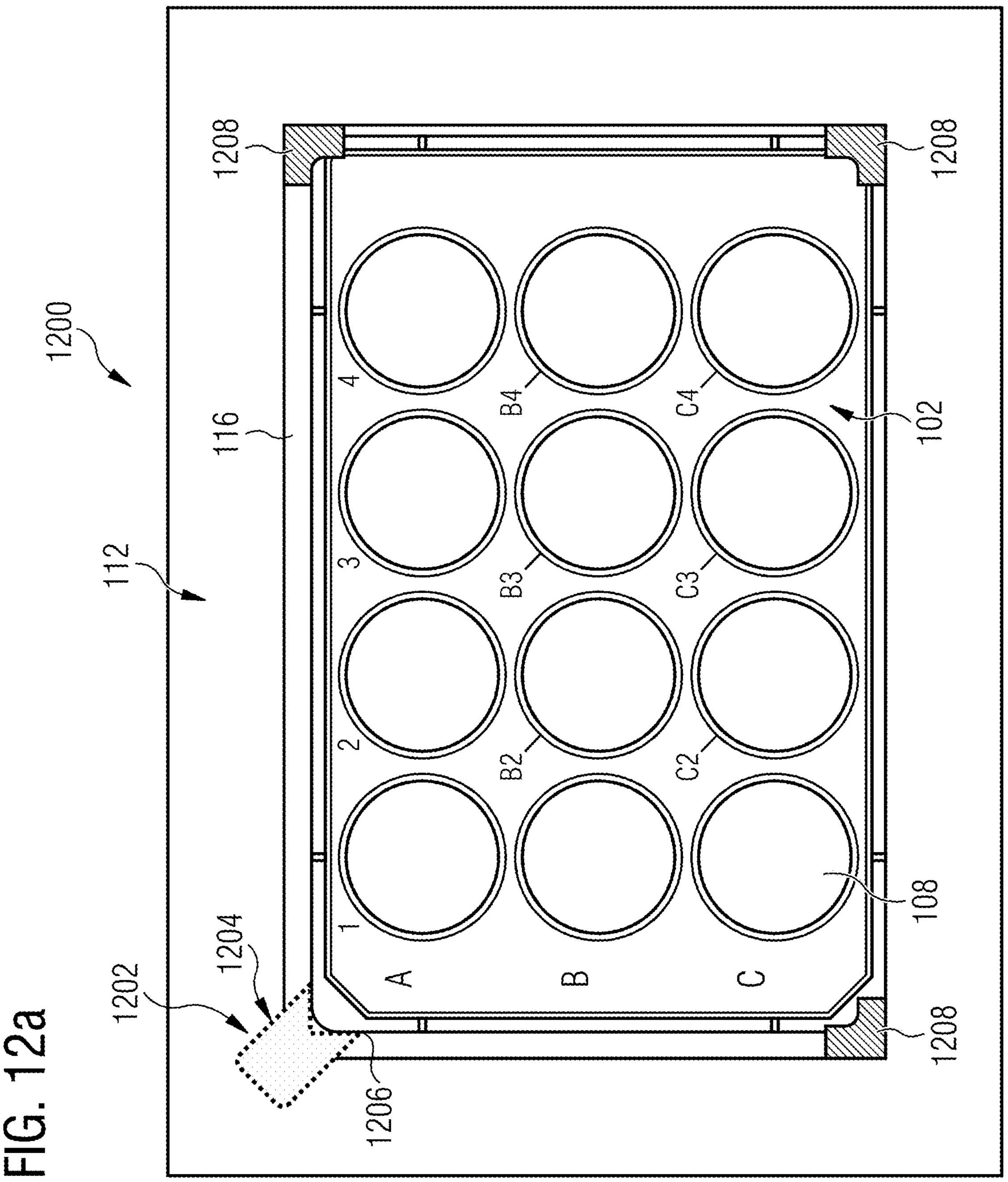
FIG. 12*a* is a schematic top view of the sample carrier interface according to an embodiment in its locked state.
Figure 12B:
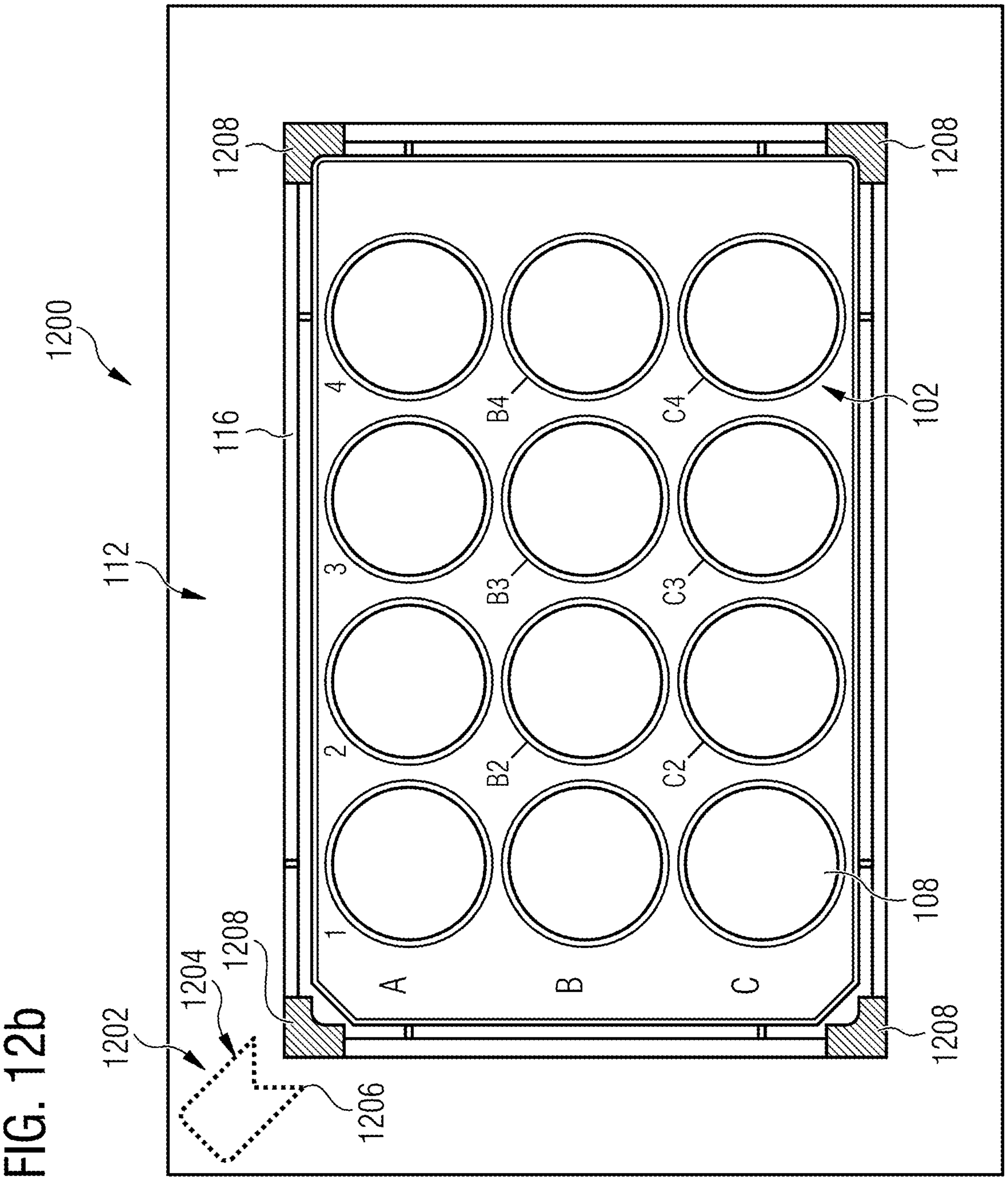
FIG. 12*b* is a schematic top view of the sample carrier interface according to the embodiment of FIG. 12*a* in its unlocked state.

FIGS. 12*a* and 12*b* each show a schematic top view of the sample carrier interface 1200 according to an embodiment.

The sample carrier interface 1200 according to FIGS. 12*a* and 12*b* is distinguished from the sample carrier interface 200 according to FIGS. 2 to 5 in the locking device 1202. The locking device 1202 according to FIGS. 12*a* and 12*b* includes a contact pin 1204 arranged in one of the corners of the frame 112. In FIGS. 12*a* and 12*b* the pin 1204 is exemplary arranged in the top left corner. The contact pin 1204 has a dovetail-shaped end 1206 which can be brought into contact with a corresponding corner of the sample carrier 102. Accordingly, the contact pin 1204 is directed towards the top right corner of the sample carrier 102 in FIGS. 12*a* and 12*b*. By bringing the contact pin 1204 in direct contact with the corner the contact pin 1204 has the function of a positive letching device.

The sample carrier interface 1200 according to FIGS. 12*a* and 12*b* is further distinguished from the sample carrier interface 200 according to FIGS. 2 to 5 in that the frame 112 includes ledges 1208 arranged in the four corners of the opening 116 at the bottom of the frame 112. These ledges 1208 prevent the sample carrier 102 from falling through the opening 116 when the sample carrier is arranged in the sample carrier interface 1200 and the locking device 1202 is in the unlocked state FIG. 12*a* shows the sample carrier interface 1200 in the locked state.

In the locked state, the contact pin 1204 has been moved towards the corresponding top left corner of the sample carrier 102 in FIG. 12*a*. The dovetail-shaped end 1206 is pressed against the corner of the sample carrier 102 from the top left, thereby exerting the lateral force on the sample carrier 102 that pushes the sample carrier 102 against the frame 112, namely the lower right corner of the opening 116 in the frame 112. Thus, in the locked state, the sample carrier 102 is clamped between the dovetail-shaped end 1206 and the lower right corner of the opening 116, thereby fixing the sample carrier 102 in position.

FIG. 12*b* shows the sample carrier interface 1200 in the unlocked state.

In the unlocked state, the contact pin 1204 has been moved towards the upper left in FIG. 12*b*. The dovetail-shaped end 1206 is no longer pressed against the corner of the sample carrier 102 and no lateral force is exerted by the locking device 1202 against the sample carrier 102. The opening 116 of the frame 112 is slightly bigger than the sample carrier 102, and thus the sample carrier 102 can move freely in the opening 116 in the unlocked state. This allows the sample carrier 102 to be removed from the sample carrier interface 1200.

Figure 13:
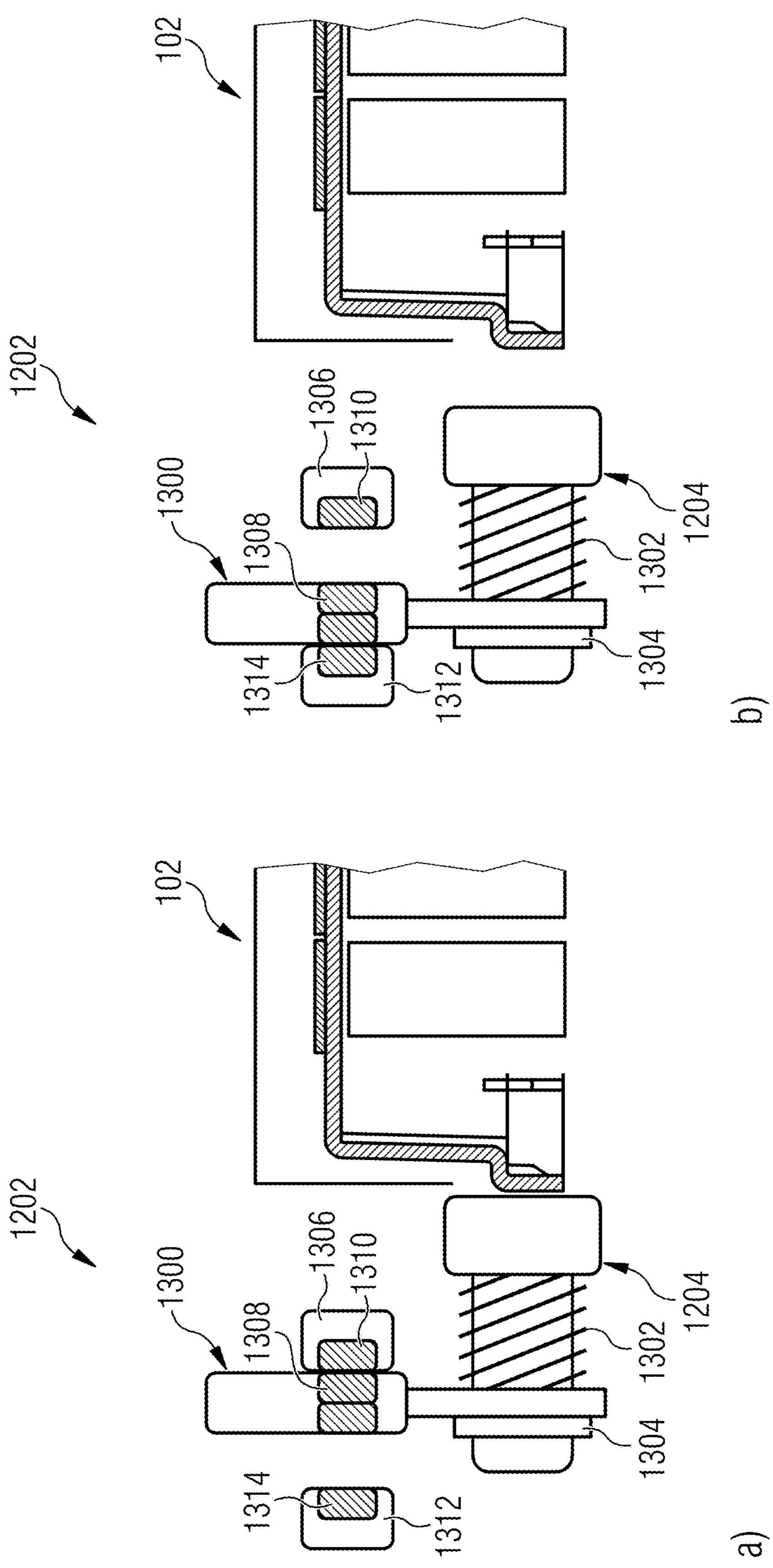
FIG. 13*a* is a detailed view of the locking device of the sample carrier interface according to the embodiments of FIGS. 12*a* and 12*b* in their locked states.
FIG. 13*b* is a detailed view of the locking device of the sample carrier interface according to the embodiments of FIGS. 12*a* and 12*b* in their unlocked states.

FIGS. 13*a* and 13*b* each show a detailed view of the locking device 1202 of the sample carrier interface 1200 according to FIGS. 12*a* and 12*b*.

The locking device 1202 includes a switch 1300 that holds the contact pin 1204 such that the contact pin 1204 can move from left to right and back with respect to the switch 1300 in FIGS. 13*a* and 13*b*. A spring 1302 forces the contact pin 1204 to the right in FIGS. 13*a* and 13*b* and such brings the contact pin 1204 into contact with the corner of the sample carrier 102 when the sample carrier 102 is arranged in the sample carrier interface 1200. A stop 1304 of the contact pin 1204 prevents the contact pin 1204 from being pushed out of the switch 1300. The arrangement of the switch 1300 of the locking device 1202 on top of the frame facilitates a quick access to the switch 1300 from above. Thereby, a user may quickly switch between the locked state and the unlocked state even if the sample carrier interface 1200 is arranged on a microscope stage.

FIG. 13*a* shows the locked state of the sample carrier interface 1200.

In the locked state, the switch 1300 is moved to the right in FIG. 13*a* and abuts against a first stop 1306. Magnets 1308, 13010 arranged in the switch 1300 and the stop 1306, respectively, prevent the switch 1300 from moving. The spring 1304 allows the contact pin 1204 to move slightly to the left in FIG. 13*a* to compensate tolerances when the contact pin 1204 is pressed against the sample carrier 102.

FIG. 13*b* shows the unlocked state of the sample carrier interface 1200.

In the unlocked state, the switch 1300 is moved to the left in FIG. 13*b* and abuts a second stop 1312. The magnet 1308 of the switch 1300 interacts with a magnet 1314 of the second stop 1312 to prevent the switch 1300 from moving in the unlocked state. The distance between the first and second stops 1306, 1312 is such that the contact pin 1204 can be moved far enough away from the sample carrier 102 to not press against the sample carrier 102 in the unlocked state.

Figure 14:
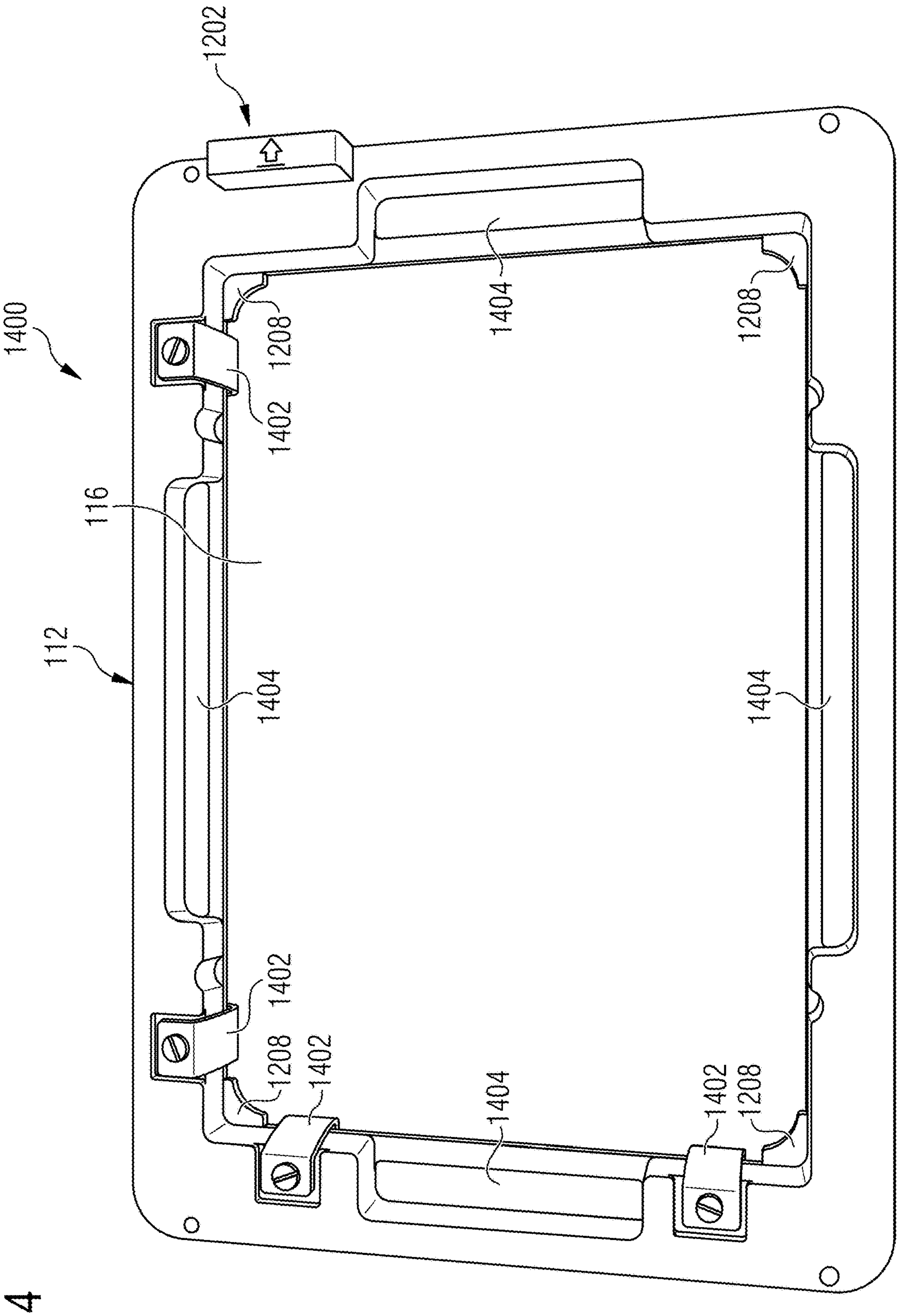
FIG. 14 is a schematic view of the sample carrier interface according to another embodiment.

FIG. 14 shows a schematic view of the sample carrier interface 1400 according to another embodiment.

The sample carrier interface 1400 according to FIG. 14 is distinguished from the sample carrier interface 1200 according to FIGS. 12*a* to 13*b* in the positioning of the locking device 1202. The locking device 1202 of the sample carrier interface 1400 is arranged on a left side of the frame 112 in FIG. 14.

The sample carrier interface 1400 according to FIG. 14 is further distinguished from the sample carrier interface 1200 according to FIGS. 12*a* to 13*b* in that the frame 112 includes leaf springs 1402. The leaf springs 1402 are arranged on the inner side of the frame 112 facing the opening 116. When the sample carrier 102 is received in the sample carrier interface 1400, the leaf springs 1402 abut the sample carrier 102. Thereby, the sample carrier 102 is positioned inside the opening 116 and held loosely. Only when the locking device 1202 is in the locked state, is the sample carrier 102 fixed in place.

The frame 112 of the sample carrier interface 1400 further includes four recesses 1404 arranged facing the inside of the opening 116. These recesses 1404 allow a user to grab the sample carrier 102 when the sample carrier 102 is received in the sample carrier interface 1400. Thereby, the sample carrier 102 can be easily removed from the sample carrier interface 1400.

Figure 15:
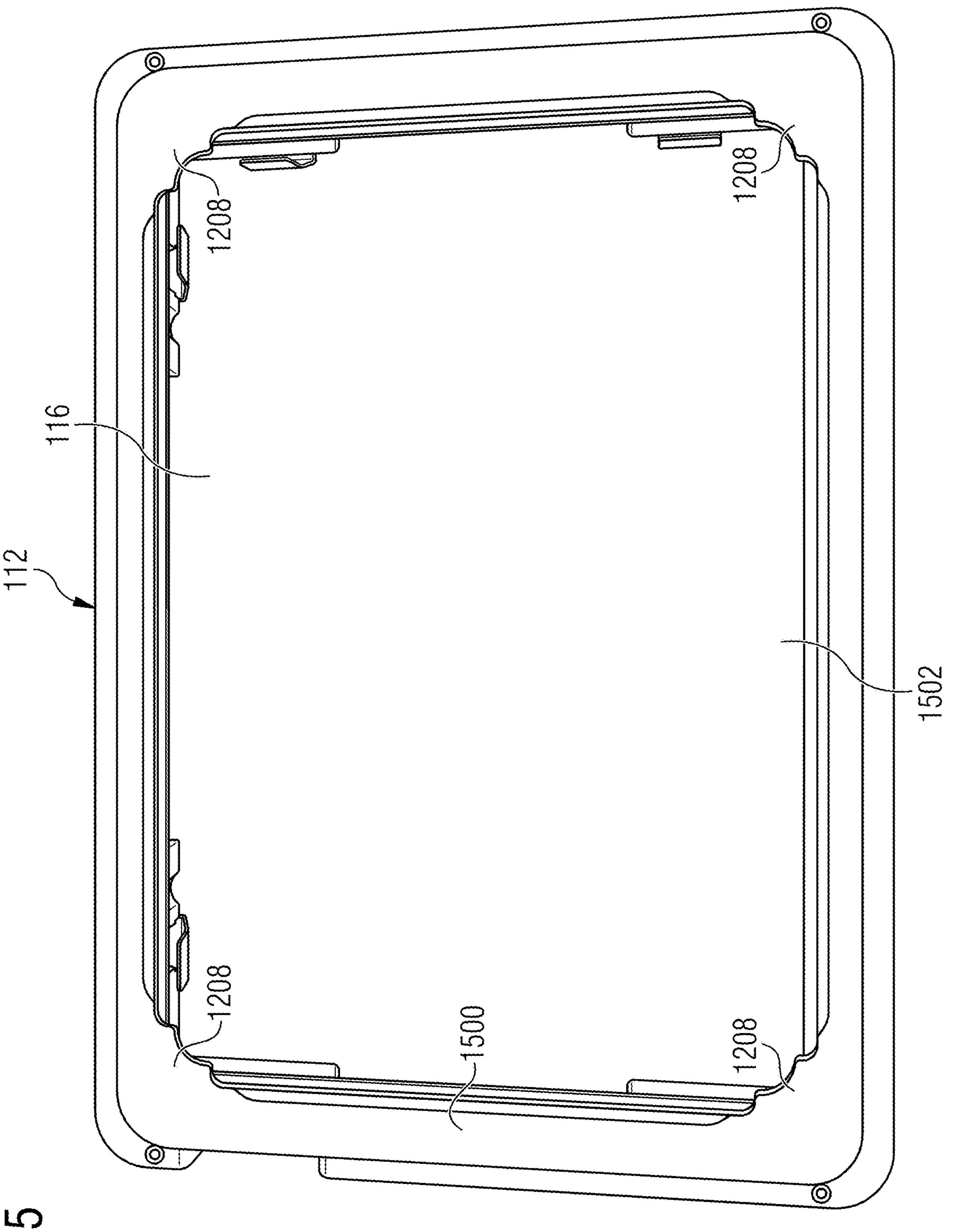
FIG. 15 is a schematic bottom view of the sample carrier interface according to the embodiment of FIG. 14.

FIG. 15 shows a schematic bottom view of the sample carrier interface 1400 according to FIG. 14.

As can be seen in FIG. 15, the sample carrier interface 1400 includes a cover panel 1500 that is arranged at the bottom side of the frame 112. The cover panel 1500 has an opening 1502 that is a continuation of the opening 116 of the frame 112 allowing samples arranged in the sample carrier 102 to be observed from below, when the sample carrier 102 is arranged in the sample carrier interface 1400. Further, the cover panel 1500 forms the ledges 1208 arranged in the corners of the opening 116.

Although all embodiments show the sample carrier interface are used in conjunction with an inverse microscope, the use of the sample carrier interface is not limited to inverse microscopes. The sample carrier interface can also be used for example in an upright microscope.

Identical or similarly acting elements are designated with the same reference signs in all Figures. As used herein the term "and/or" includes any and all combinations of one or more of the associated listed items and may be abbreviated as "/". Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

| | |
|---|---|
| 100 | sample carrier interface |
| 102 | sample carrier |
| 104 | microscope stage |
| 106 | objective |
| 108 | well |
| 110 | opening |
| 112 | frame |
| 114 | cavity |
| 116 | opening |
| 118 | spacer element |
| 120a, 120b | fixing element |
| 122 | locking device |
| 124 | engaging portion |
| 200 | sample carrier interface |
| 202 | slider |
| 300 | inside wall |
| 600 | arrangement |
| 602, 604 | rod |
| 606, 608 | joint |
| 610 | guiding element |
| 700 | sample carrier |
| 702 | sample carrier interface |
| 704 | microscope stage |
| 706 | surface |
| 708 | objective |
| 800 | sample carrier interface |
| 802 | incubation chamber |
| 804 | lid |
| 806 | sealing portion |
| 808 | gas inlet |
| 1000 | sample carrier interface |
| 1002 | sample carrier |
| 1004 | dot |
| 1006 | rectangle |
| 1100 | sample carrier |
| 1102, 1104 | rectangle |
| 1106 | sample carrier |
| 1108, 1110 | rectangle |
| 1200 | Sample carrier interface |
| 1202 | Locking device |
| 1204 | Contact pin |
| 1206 | End |
| 1208 | Ledge |
| 1300 | Switch |
| 1302 | Spring |
| 1304, 1306 | Stop |
| 1308, 1310 | Magnet |
| 1312 | Stop |
| 1314 | Magnet |
| 1400 | Sample carrier interface |
| 1402 | Leaf spring |
| 1404 | Recess |
| 1500 | Cover panel |
| H | line |
| O | optical axis |

The invention claimed is:

1. A sample carrier interface for mounting a sample carrier on a microscope stage, the sample carrier interface comprising:

a frame configured to receive the sample carrier and to be positioned atop an opening of the microscope stage; and a locking device configured to exert a lateral force to the sample carrier when the locking device is in a locked state in order to keep the sample carrier suspended above the opening when the sample carrier is received in the frame and the frame is positioned atop the opening of the microscope stage, wherein the locking device is further configured to hold the sample carrier in place when the sample carrier interface is moved to and from the microscope stage, and when the locking device is in the locked state, and wherein the locking device comprises an adjusting element for switching between the locked state and an unlocked state in which the locking device does not exert the lateral force to the sample carrier.

2. The sample carrier interface according to claim 1, wherein the frame comprises an opening at a bottom side and the frame is configured to receive the sample carrier through the opening.

3. The sample carrier interface according to claim 1, wherein a bottom side of the frame defines a contact surface that contacts a top surface of the microscope stage when the frame is positioned atop the opening of the microscope stage.

4. The sample carrier interface according to claim 3, wherein the contact surface of the frame is at a same height as a bottom side of the sample carrier when the sample carrier is received in the frame and the frame is positioned atop the opening of the microscope stage.

5. The sample carrier interface according to claim 1, wherein the sample carrier is completely received inside the frame.

6. The sample carrier interface according to claim 1, wherein the locking device further comprises at least one moveable engaging portion configured to engage with the sample carrier and thereby exert the lateral force to the sample carrier when the locking device is in the locked state.

7. The sample carrier interface according to claim 1, wherein the locking device further comprises a wire that wraps around the sample carrier when the sample carrier is received in the frame; and wherein the wire is configured to tighten in order to exert the lateral force to the sample carrier.

8. The sample carrier interface according to claim 1, wherein the sample carrier interface further comprises at least one fixing element configured to engage with a corresponding fixing element of the microscope stage.

9. The sample carrier interface according to claim 1, wherein the sample carrier interface further comprises at least one guiding portion configured to engage with the microscope stage for positioning the sample carrier interface atop the microscope stage.

10. The sample carrier interface according to claim 1, wherein the frame is configured to form a gas tight incubation chamber when the sample carrier is received in the frame.

11. The sample carrier interface (100) according to claim 10, wherein the locking device comprises a sealing portion configured to provide a gas tight seal to the gas tight incubation chamber when the sample carrier is received in the frame and the locking device is in the locked state.

12. The sample carrier interface according to claim 10, wherein the frame comprises a gas inlet for providing an incubation atmosphere, a semi-sterile atmosphere, and/or a sterile atmosphere to the gas tight incubation chamber.

13. The sample carrier interface according to claim 1, wherein the sample carrier is a microwell plate or a slide holder.

14. A method for adapting a sample carrier to a microscope stage, comprising the following steps:

a) providing the sample carrier interface according to claim 1;

b) inserting the sample carrier into the frame of the sample carrier interface;

c) locking the sample carrier to the frame by exerting the lateral force to the sample carrier; and d) placing the sample carrier interface atop the opening of the microscope stage in order to suspend the sample carrier above the opening.

15. The method according to claim 14, further comprising the following additional steps: placing the sample carrier on a flat surface or a dedicated mounting plate; and lowering the sample carrier interface onto the sample carrier from above.

* * * * *